United States Patent
Iwayama et al.

(10) Patent No.: US 7,984,044 B2
(45) Date of Patent: Jul. 19, 2011

(54) SYSTEM OR PROGRAM FOR SEARCHING DOCUMENTS

(75) Inventors: Makoto Iwayama, Tokorozawa (JP);
Osamu Imaichi, Koganei (JP);
Tomohiro Yasuda, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 385 days.

(21) Appl. No.: 12/342,166

(22) Filed: Dec. 23, 2008

(65) Prior Publication Data
US 2009/0248652 A1 Oct. 1, 2009

(30) Foreign Application Priority Data
Apr. 1, 2008 (JP) ................................. 2008-095462

(51) Int. Cl.
*G06F 17/30* (2006.01)

(52) U.S. Cl. ........................................... 707/719
(58) Field of Classification Search .................. 707/713, 707/719, 769, 737
See application file for complete search history.

(56) References Cited

U.S. PATENT DOCUMENTS

| | | | |
|---|---|---|---|
| 5,454,105 A | 9/1995 | Hatakeyama et al. | |
| 2005/0278368 A1* | 12/2005 | Benedikt et al. | 707/101 |

OTHER PUBLICATIONS

Boyer R.S. et al., "A fast string search algorithm", Communications of the ACM, 20 (10): pp. 762-772, 1997.

* cited by examiner

*Primary Examiner* — Jean B. Fleurantin
*Assistant Examiner* — Thu-Nguyet Le
(74) *Attorney, Agent, or Firm* — Brundidge & Stanger, P.C.

(57) ABSTRACT

In document search for searching a document by use of a query formula composed of a Boolean formula of keywords, a plurality of query formulas arriving at about the same time from a plurality of users are efficiently processed. A system or a program for searching documents includes: a query formula controller for sorting a plurality of query formulas into a plurality of query formula sets based on predicted search speeds of the respective query formulas; and a search unit for searches for the plurality of sorted query formula sets sequentially from the set having the fastest predicted search speed, and for, in each search processing, merging the query formulas in the corresponding query formula set into a formula and thereby searching from the merged formula.

5 Claims, 16 Drawing Sheets

FIG. 19

| Query formula arrival time | Proportion | Type | Proportion | Waiting time (Average) | Search time |
|---|---|---|---|---|---|
| $0 \leq t < T_1$ | $T_1 / (T_1 + T_2)$ | High-speed | $p$ | $T_1/2$ | $T_2$ |
| | | Low-speed | $1-p$ | | |
| $T_1 \leq t < T_1 + T_2$ | $T_2 / (T_1 + T_2)$ | High-speed | $p$ | $T_2/2$ | $T_1$ |
| | | Low-speed | $1-p$ | $T_2/2 + T_1$ | $T_2$ |

$T_1$   Search time of high-speed search
$T_2$   Search time of low-speed search
$p$   Proportion of queries for high-speed search

FIG. 20

| | Average response time | Worst response time |
|---|---|---|
| Normal method | $\frac{3}{2}T_2$ | $2T_2$ |
| Alternating searching method | $\frac{1}{T_1 + T_2}\left\{\frac{1}{2}T_1^2 + 2T_1 T_2 + \left(\frac{3}{2} - p\right)T_2^2\right\}$ | $T_1 + 2T_2 \leq 3T_2$ |

Conditions where alternating searching method exceeds normal method $$\left(p - \frac{T_1}{T_2}\right) + \frac{1}{2}\left(\frac{T_1}{T_2} - \left(\frac{T_1}{T_2}\right)^2\right) > 0$$

| Estimated number of documents as search result | Number of query formulas |
|---|---|
| 0 ~ t_1 | n1 |
| t_1 ~ t_2 | n2 |
| t_2 ~ t_3 | n3 |
| t_3 ~ t_4 | n4 |
| ... | ... |
| t_k-1 ~ t_k | nk |

23

2301   2302

SYSTEM OR PROGRAM FOR SEARCHING DOCUMENTS

CLAIM OF PRIORITY

The present application claims priority from Japanese patent application JP 2008-095462 filed on Apr. 1, 2008, the content of which is hereby incorporated by reference into this application.

BACKGROUND OF THE INVENTION

1. Field of the Invention

The present invention relates to a technique for efficiently searching documents by merging a plurality of query formulas in document search.

2. Description of the Related Art

In order to stably provide a document search service, it is required to return a search result within a certain time period even at service peak times. At the service peak times, a plurality of query formulas arrive at a search server one after the other. As a method for processing the plurality of query formulas, a method for sequentially processing the query formulas from the one that has arrived first (a sequential processing method) and a method for processing the plurality of query formulas in parallel by use of a time sharing function of an OS (a parallel processing method) have been well known. However, in each of the above methods, as the number of query formulas to be processed at one time is increased, a response time for each of the query formulas is also increased in proportion to the number. In the parallel processing method, simultaneous processing capability is enhanced if more than one CPU is used. However, when the number of query formulas to be processed at one time exceeds several tens, processing slows down.

In light of the above problems, a method in which a plurality of query formulas are merged by an OR operation, and merged search is performed by using the resulting formula (a merged processing method) (U.S. Pat. No. 5,454,105) has been proposed. The merged processing method varies in performance depending on the document search method on which the merged processing method is based. Here, a search method in which the search is performed while scanning a document from the beginning (scan-type search) is considered as an example. In scan-type search, while the same document is repeatedly scanned more than once in the sequential processing method or the parallel processing method, the document is scanned only once in the merged processing method. However, since the query formulas are merged by the OR operation, it is required to check afterwards which one of the query formulas hits a certain document. Still, the processing can be speeded up compared with the case where the document is scanned more than once.

SUMMARY OF THE INVENTION

In the merged processing method, a search speed is often controlled on the basis of the slowest query formula among the query formulas combined by the OR operation. Specifically, even the search speed of a query formula that can achieve fast search slows down when the query formula is merged with a slow query formula by the OR operation. This property appears prominently in hybrid search combining index-type search and the scan-type search. In the hybrid search, only a document narrowed down by index-type search is scanned. In the hybrid search, only documents narrowed down by using an index are scanned. When a query formula that requires only 10 documents to be scanned after the narrowing down and a query formula that requires 10,000 documents to be scanned even after the narrowing down are combined by an OR operation, over 10,000 documents have to be scanned also for the former query formula. As a result, the effect of the narrowing down by use of the index is lost.

In order to solve the foregoing problem, in the present invention, a plurality of query formulas are divided into a plurality of sets based on predicted search speeds. Thereafter, the query formulas are combined by an OR operation within each set. Subsequently, merged search is performed by using the query formula sets sequentially from the query formula set having the fastest estimated search speed. Here, a method for estimating the search speed and a method for dividing the query formulas into the sets are the points. As to the former, by taking the hybrid search described above as an example, an estimated value of the number of documents to be scanned is set to be the predicted search speed. The number of documents to be scanned can be estimated from the number of hits of component terms of the query formula. As to the method for dividing the query formulas into the sets, optimum division parameters are determined from a history of previously executed searches.

The present invention can achieve a response time which is not much different from that at normal times even at service peak times when a plurality of query formulas arrive at about the same time.

BRIEF DESCRIPTION OF THE DRAWINGS

FIG. 19 is an explanatory view showing a list of waiting times and search times for each query formulas depending on arrival time thereof.

FIG. 20 is an explanatory view comparing a method according to the embodiment of the present invention with a normal merged search method on an average response time and a worst response time.

FIG. 23 is a view showing an example of a table required to dynamically determine an optimum division ratio of query formulas in the embodiment of the present invention.

DETAILED DESCRIPTION OF THE PREFERRED EMBODIMENTS

Figure 1:
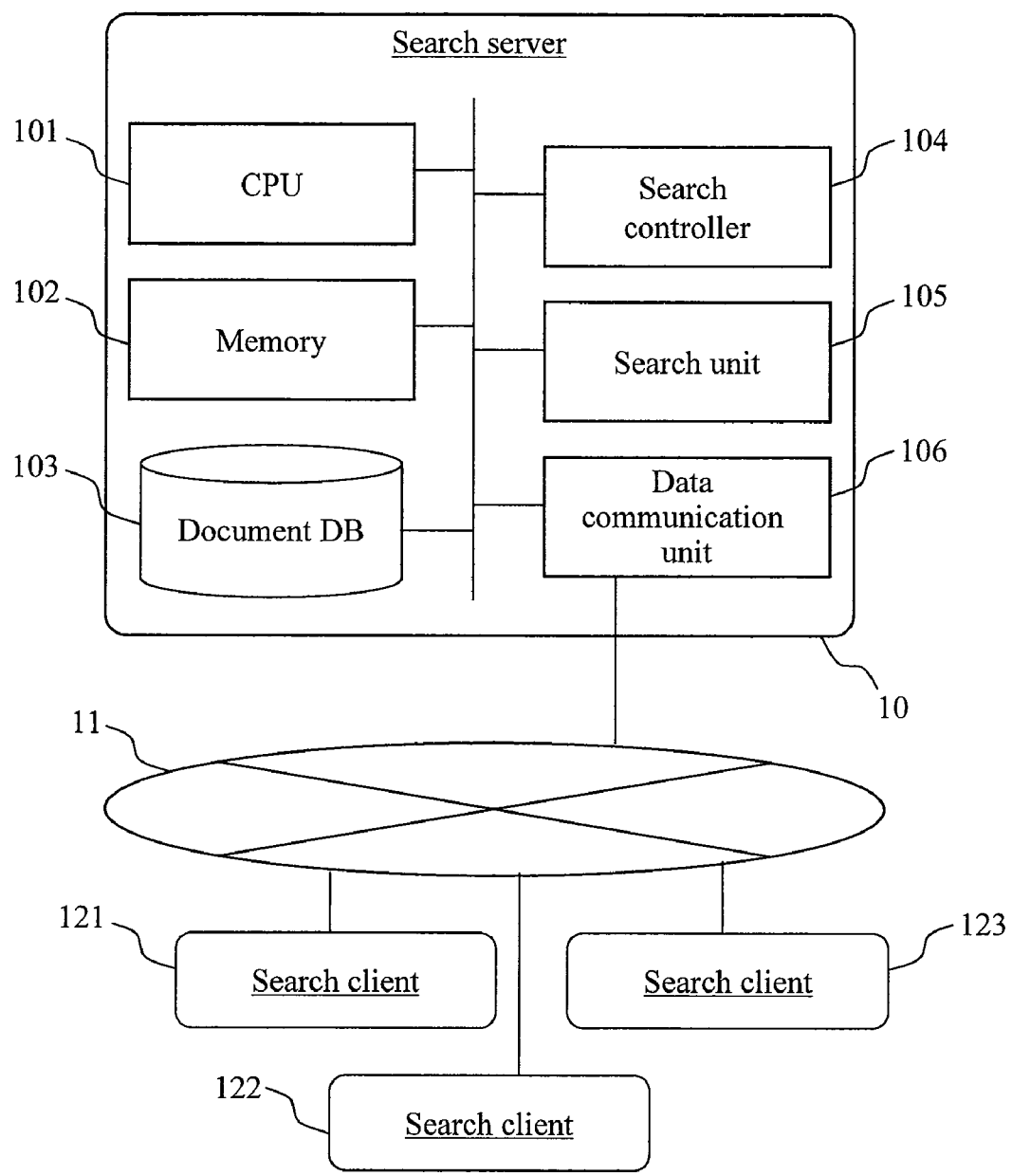
FIG. 1 is a block diagram showing a configuration example of a document search system according to the present invention.

With reference to the drawings, an embodiment of the present invention will be described below. FIG. 1 is a view showing a configuration example of a document search system according to the present invention. The document search system includes a search server 10, a network 11 and an arbitrary number of search clients 121 to 123.

The search server 10 includes a CPU 101, a memory 102, a document DB 103, a search controller 104, a search unit 105 and a data communication unit 106. The CPU 101 executes various processing by executing various programs that constitute the search controller 104 and the search unit 105. The memory 102 temporarily stores the programs to be executed by the CPU 101 and data required to execute the programs. The document DB 103 stores documents to be searched and indices required to search those documents. The data communication unit 106 is an interface which performs data communication through the network 11 and is formed of, for example, a LAN card capable of performing communication by a TCP/IP protocol. The search server 10 communicates with the plurality of search clients, which are connected to the network 11, through the data communication unit 106. In FIG. 1, there are three search clients 121 to 123.

Each of the search clients receives a query formula from a user, sends the query formula to the search server 10 through the network 11, receives a search result from the search server 10 similarly through the network 11, and presents the search result to the user. Description of an internal configuration of the search client will be omitted.

Figure 6:
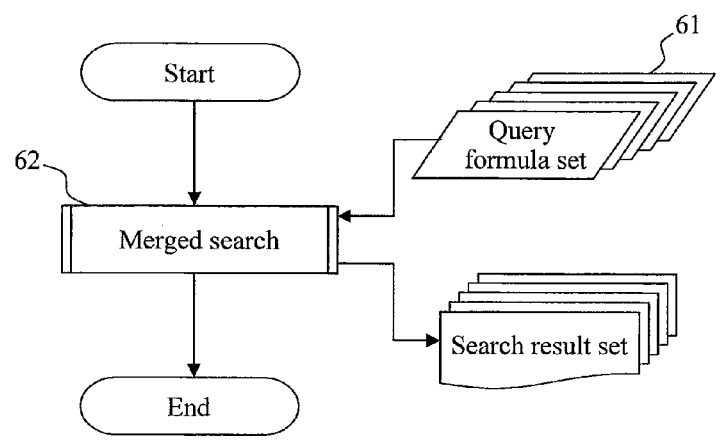
FIG. 6 is a flowchart of a merged processing method (a conventional method).

As a processing method in the case where query formulas arrive at about the same time at the search server from the plurality of search clients, there are a sequential processing method (FIG. 2), a parallel processing method (FIG. 4) and a merged processing method (FIG. 6). Before description is given of the embodiment of the present invention, each of the above conventional methods will be described first.

Figure 2:
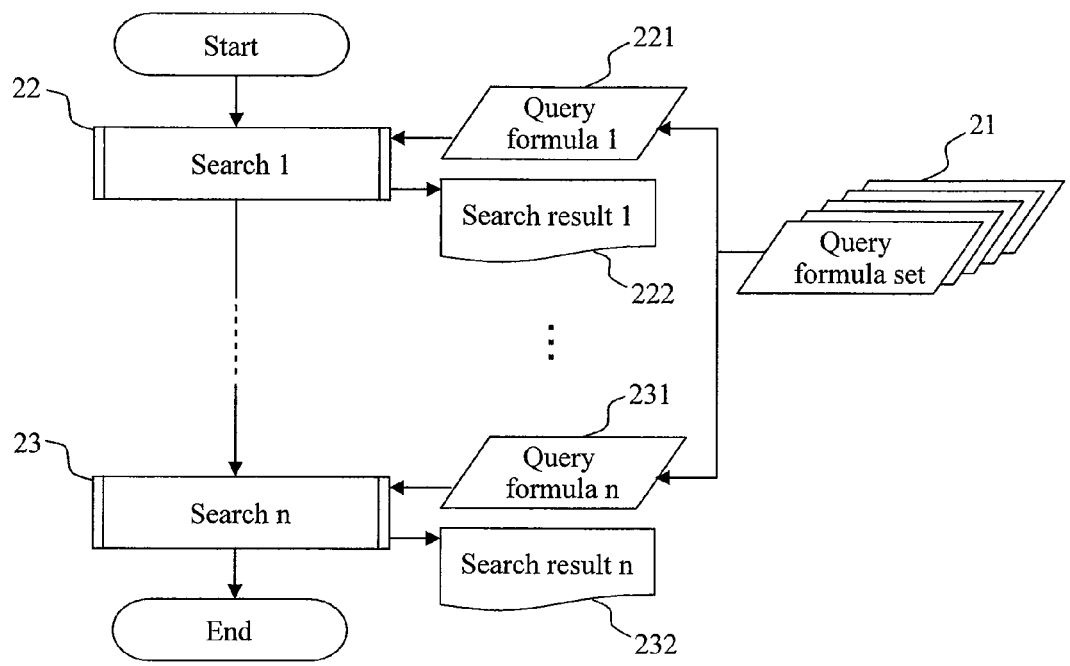
FIG. 2 is a flowchart of a sequential processing method (a conventional method).

In the sequential processing method shown in FIG. 2, a query formula set 21 that has arrived is processed one by one in a certain order. The simplest order is an order of arrival of query formulas. In FIG. 2, search 1 (22) to search n (23) are sequentially executed in order of query formula 1 (221) to query formula n (231). Moreover, search result 1 (222) to search result n (232), which are results of the respective searches, are returned to the search clients.

Figure 3:
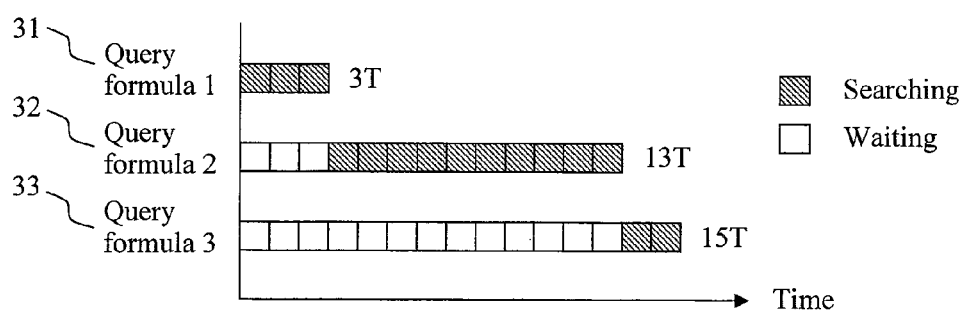
FIG. 3 is a time chart of the sequential processing method (the conventional method).

FIG. 3 shows a time chart of the sequential processing method. Here, three query formulas 31, 32 and 33 are processed in this order. When the query formulas are individually issued, search times of 3T, 10T and 2T are required for query formulas 31, 32 and 33, respectively. Here, T is a unit time and corresponds to each of squares in FIG. 3. Moreover, hatched squares represent search in progress and outline squares represent waiting.

In the sequential processing method, a query formula to be executed later waits for completion of a previous query formula. Thus, the query formula to be executed later has a longer waiting time and a response time is increased. In the case of the example shown in FIG. 3, while search for query formula 1 that is executed first is completed in 3T, a waiting time of 3T occurs for query formula 2 to be executed next. When combined with the search time, a response time is calculated as 3T+10T=13T. Similarly, a response time of query formula 3 to be executed last is calculated as 13T+2T=15T. For query formula 3, fast search can be performed, which takes only 2T, when the search is independently executed. However, in the sequential processing method, since the search for query formula 3 is executed last, a waiting time of 13T is required.

Figure 4:
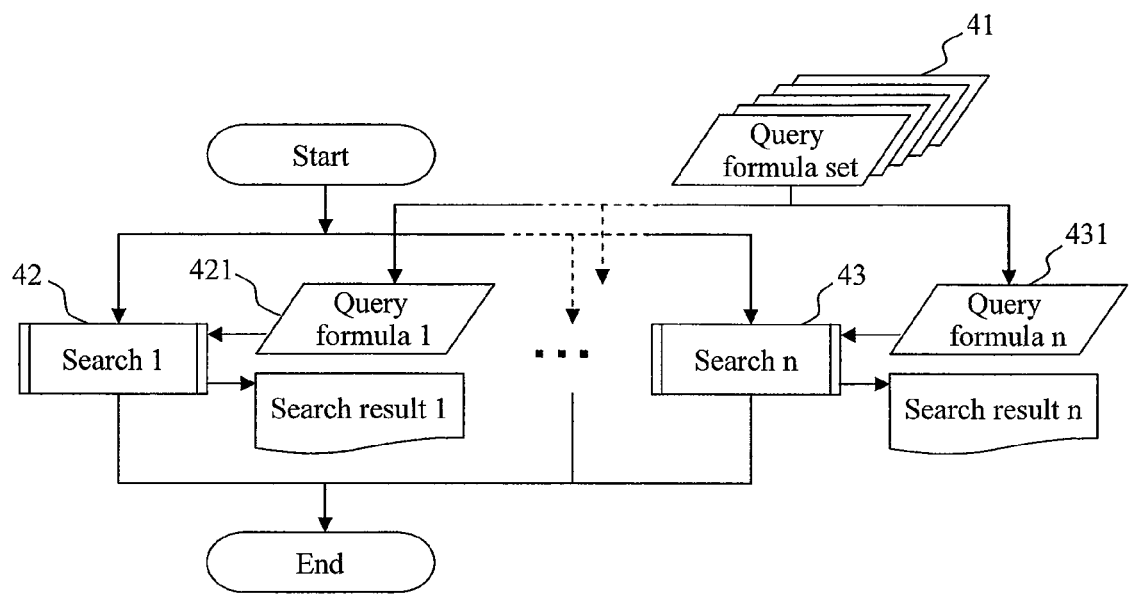
FIG. 4 is a flowchart of a parallel processing method (a conventional method).

In order to overcome a drawback of the sequential processing method that the query formula to be executed later has a disadvantage, processing may be carried out equally for any of the query formulas, as in the case of the parallel processing method shown in FIG. 4. Normally, the processing is equally carried by using a method called a time sharing method in which a target to be processed is switched at each finely divided time. Since the time sharing method is often implemented in the OS, it is only necessary to simply issue commands in parallel in an application. In FIG. 4, for n query formulas 421 to 431 in a query formula set 41, n search processes from search 1 (42) to search n (43) are executed in parallel.

Figure 5:
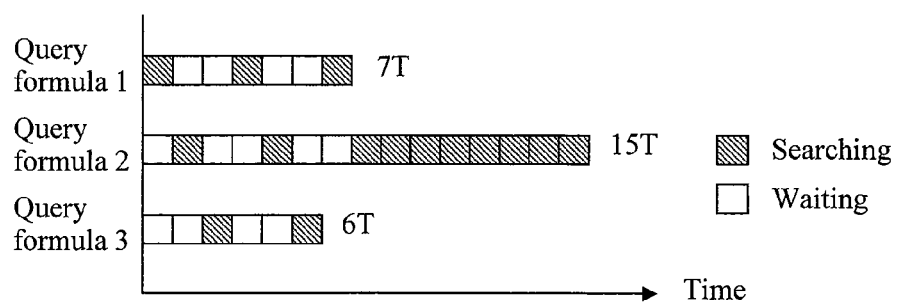
FIG. 5 is a time chart of the parallel processing method (the conventional method).

FIG. 5 shows a time chart of the parallel processing method. Query formulas are the same as those shown in FIG. 3. In a first processing time T, search for query formula 1 is carried out. In a next processing time T, search for query formula 2 is carried out. Since the search processes are carried out for each unit time in order as described above, waiting times of all the query formulas are set equal. A response time is set to 7T for query formula 1, 15T for query formula 2 and 6T for query formula 3. These response times are proportional to search times for the respective query formulas during independent processing. In the sequential processing method shown in FIG. 3, a total response time (equivalent to an average response time) is set to 31T (3T+13T+15T). Meanwhile, in the parallel processing method, the total response time is reduced to 28T (7T+15T+6T).

In the two methods described above, since each of the query formulas is independently processed, the same processing may be repetitively executed. For example, in scan-type search for performing search by scanning a document, the same document may be redundantly scanned by multiple query formula. Therefore, in the merged processing method shown in FIG. 6, query formulas in a query formula set 61 are OR-combined to generate a new query formula, and merged search processing 62 is executed by use of the new query formula thus generated. Since the same document is processed just once in the merged search, redundant processing as described above is eliminated. The merged search processing will be described in detail later.

Figure 7:
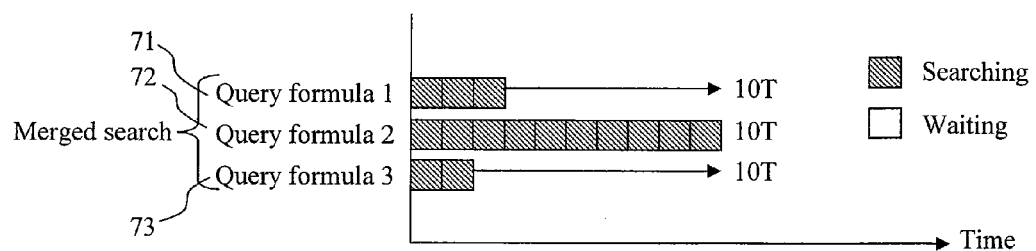
FIG. 7 is a time chart of the merged processing method (the conventional method).

FIG. 7 shows a time chart of the merged processing method. Here, a maximum independent search time of a query formula among query formulas in merged processing targets is set to be an overall merged processing time. This processing time is an approximate value and, in reality, a time longer than the maximum time is often required. As can be seen in FIG. 7, the merged processing method has a problem that query formulas 71 and 73, for which search is quickly finished, are slowed down by a slow query formula 72. A total response time is 30T (10T+10T+10T), and is long. Such a problem does not occur if the search method is such as one having the same search speed for any query formula. However, in most search methods, the search time varies depending on the query formula. Thus, the above problem becomes evident.

Figure 8:
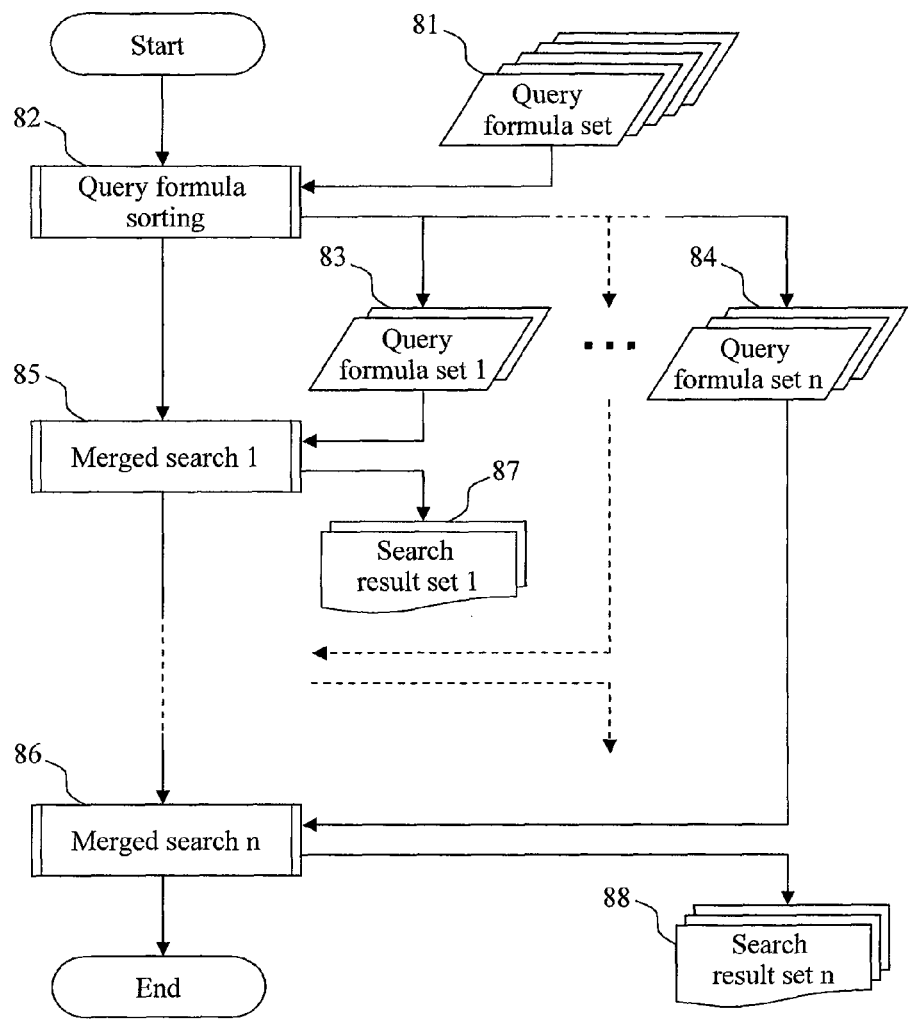
FIG. 8 is a flowchart of processing according to an embodiment of the present invention.

FIG. 8 shows a flowchart according to the embodiment of the present invention. In the embodiment of the present invention, query formulas are sorted into a plurality of sets based on predicted search times, and merged processing is executed for each set. Therefore, first, in query formula sorting processing 82, a query formula set 81 to be subjected to merged processing is divided into a plurality of query formula sets (n query formula sets 83 to 84) according to predicted search times. The query formula sorting processing will be described in detail later. Next, the divided query formula sets are sequentially processed from the one having the shortest predicted search time (n merged searches 85 to 86). In each merged search processing, a plurality of query formulas are merged by OR combination and then processed as in the case of normal merged search. Once search result sets 87 to 88 are obtained, search results are returned to the search clients at that time.

Figure 9:
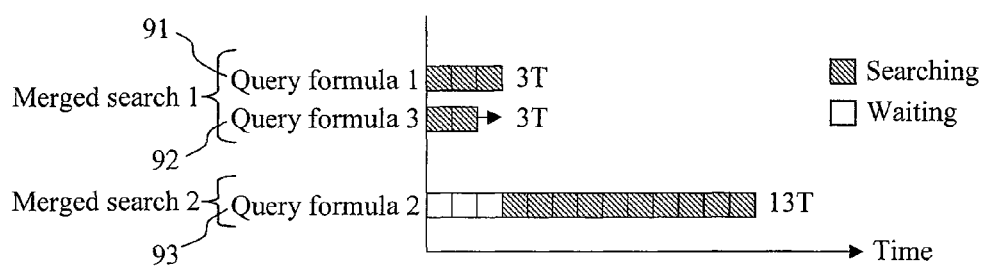
FIG. 9 is a time chart of the processing according to the embodiment of the present invention.

FIG. 9 shows a time chart of the method according to the embodiment of the present invention. Here, it is assumed that query formula 1 (91) and query formula 3 (92) are merged as merged search 1. As described above, in the merged search, the search time of the slowest query formula is set to be the overall search time. Meanwhile, as in the example of the embodiment, if only query formulas having almost the same search speed can be merged, a problem that a fast query formula is slowed down by a slow query formula becomes unlikely to occur. In the case of this example, query formula 3 is as fast as 2T and query formula 1 to be simultaneously processed is also as fast as 3T. Thus, even when merged processing is performed, only 1T is wasted. In the case of the conventional method shown in FIG. 7, due to the much slower query formula 2, both of query formulas 1 and 3 require 10T. In the method according to the embodiment of the present invention, the remaining query formula 2 (93) is processed after waiting for a result of merged search 1. Thus, a waiting time of 3T occurs, which is the processing time of merged search 1. However, in consideration of overall efficiency, the method of the embodiment is more advantageous in the average search time. Actually, a total response time is set to 18T (3T+3T+13T), which is shorter than that in any of the conventional methods.

Figure 10:
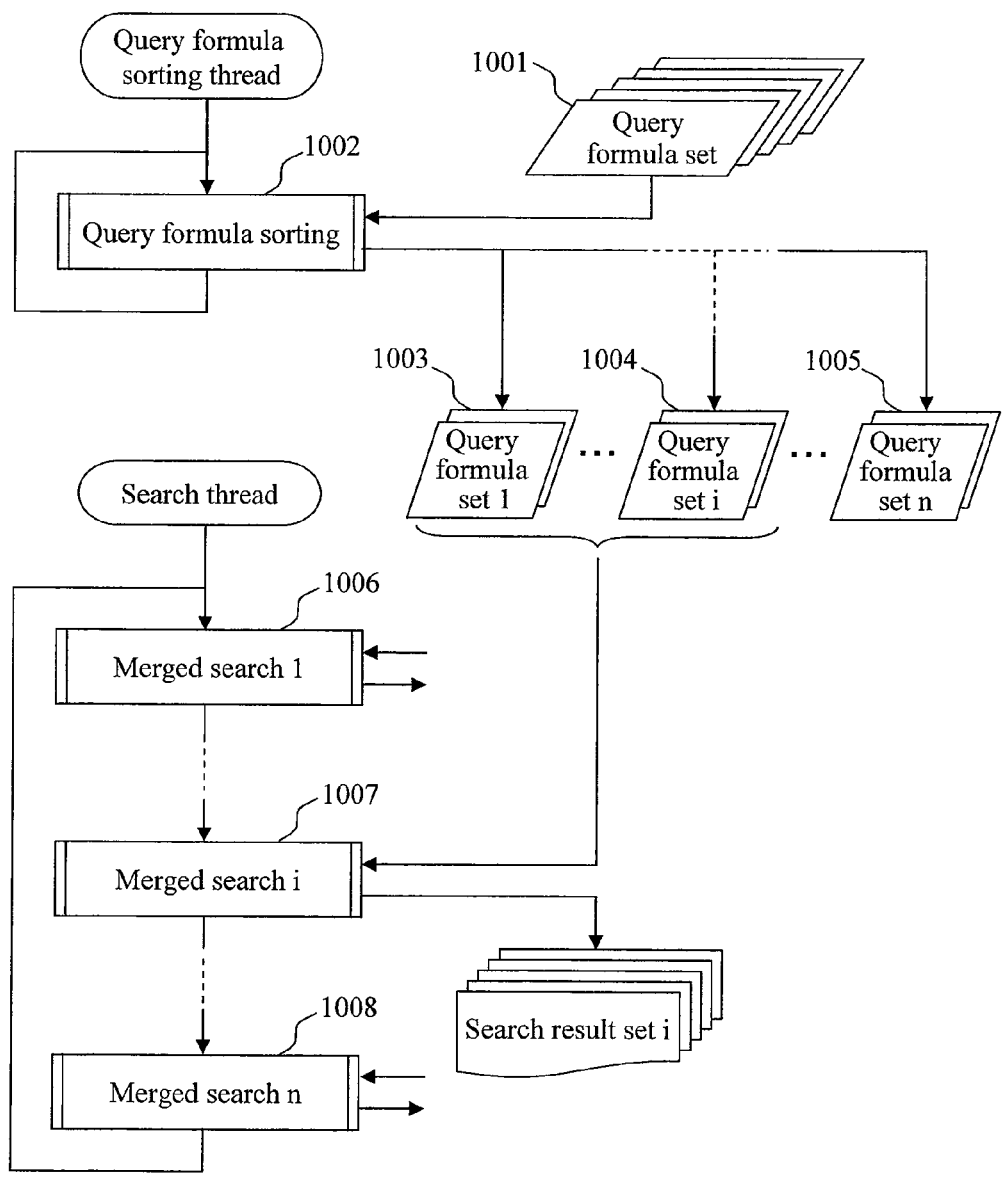
FIG. 10 is a flowchart of processing (thread version) according to the embodiment of the present invention.

In the method shown in FIG. 8, the query formula sorting processing and the merged search processing are sequentially executed on the same processing flow. Thus, for example, the query formula that can be processed in subsequent merged search among the query formulas that have arrived during the processing of merged search 1 (85) has to wait for next processing. FIG. 10 is a flowchart in which the query formula sorting processing and the merged search processing are executed independently by use of separate threads. A query formula sorting thread sorts, independently of the merged search, query formulas in a query formula set 1001 into a query formula set 1 (1003) to a query formula set n (1005). A search thread sequentially and repeatedly executes merged search 1 (1006) to merged search n (1008). However, in each merged search, a query formula set that should be processed in previous merged search is also subjected to merged processing. For example, in merged search i (1007), not only query formulas sorted into a query formula set i (1004) for the merged search i but also query formulas sorted into the query formula sets 1 to i−1 that come before the query formula set i are also subjected to merged processing. This utilizes a property that the overall search speed is not reduced even if the merged search is executed by adding query formulas faster than itself. However, this property may not be achieved. Thus, also conceivable is a method for processing only the query formula set (the query formula set i (1004) in the case of the example) that should be originally processed.

In the embodiment of the present invention, the query formula sorting thread is executed by the search controller 104 shown and the search thread is executed by the search unit 105 in FIG. 1.

The outline of the embodiment of the present invention has been described above. Hereinafter, the query formula sorting processing and the merged search processing, which are main parts of the embodiment of the present invention, will be described in detail. Before that, description will be given of search methods as a basis of the embodiment of the present invention.

Figure 11:
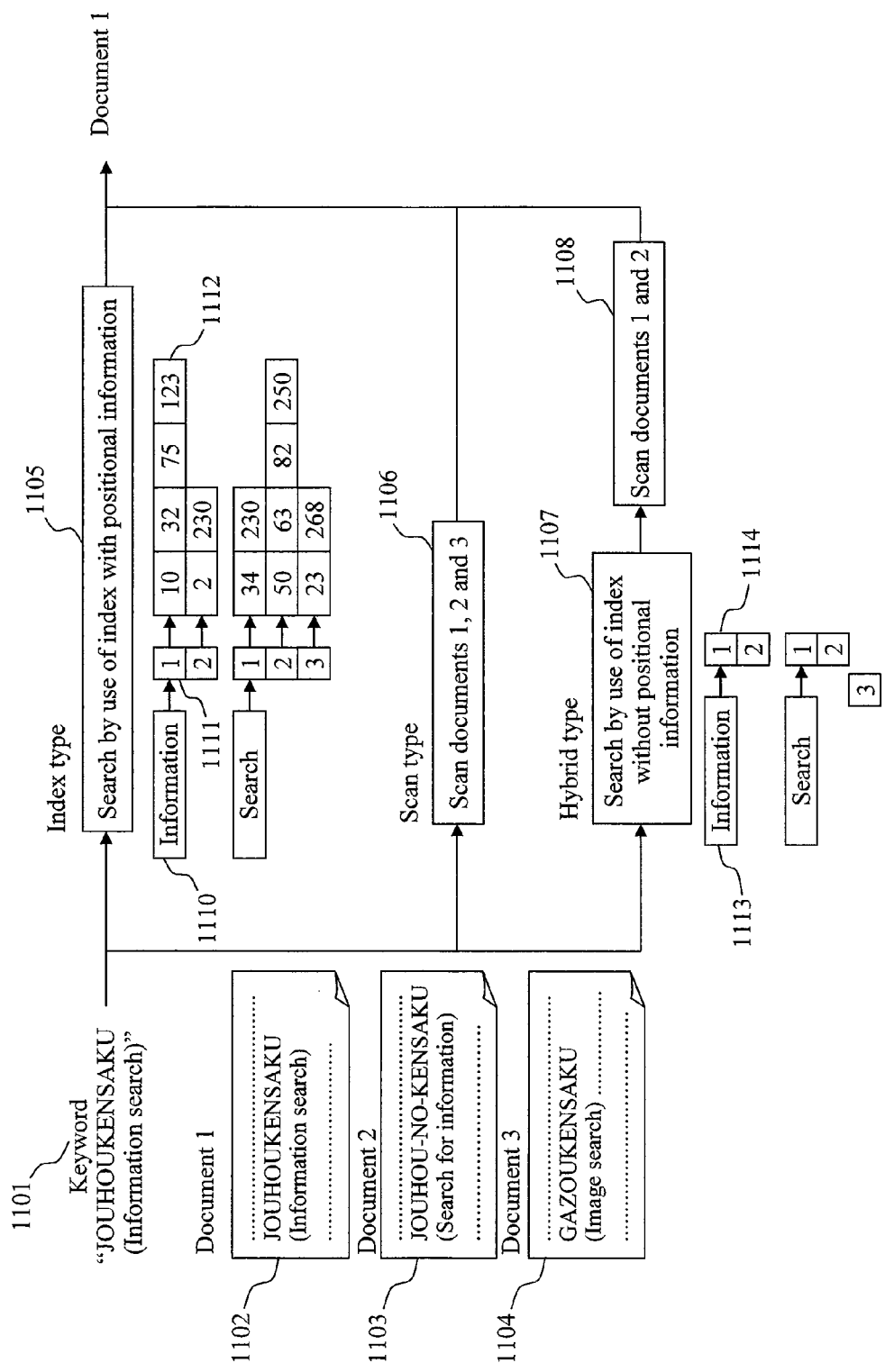
FIG. 11 is a schematic diagram showing typical search methods (an index type, a scan type and a hybrid type).

FIG. 11 is a view for explaining typical document search methods. In any case, a document containing a search keyword "jouhoukensaku (information search)" (1101) is searched. Search targets are three documents Document 1 (1102), Document 2 (1103) and Document 3 (1104). Document 1 contains a character string "jouhoukensaku," Document 2 contains a character string "jouhou-no-kensaku (search for information)" and Document 3 contains a character string "gazokensaku (image search)". Thus, a search result of this search turns out to be Document 1.

First, in an index-type search 1105, indices are previously generated and search is performed by use of the indices. The indices are generated for every search term. In FIG. 11, indices are generated for two search terms "jouhou (information)" and "kensaku (search)". While there are various kinds of search terms, a unit called a morpheme is set as the search term in FIG. 11. For each search term, an appearance document list and a position list in each of the appearance document are previously enumerated and stored. For example, for a search term "jouhou" 1110, Documents 1 and 2 in which "jouhou" appears are stored in an appearance document list 1111. At the same time, as to Document 1, for example, a position where "jouhou" appears within the document is stored in a position list 1112. The position may be either a byte unit or a character unit. In the search, first, documents (Documents 1 and 2 in the case of the example) in which both of "jouhou" and "kensaku" appear are searched by use of the appearance document list 1111. Thereafter, for each of the documents, whether or not both of the terms successively appear is checked by use of the position list. In the case of the example, Document 2 contains "jouhou-no-kensaku". Thus, it is found out that Document 2 is not a hit since there is one character between "jouhou" and "kensaku". In the index-type search, although high-speed search can be performed by use of the indices, the indices have to be previously prepared.

Moreover, a size of the indices including the position list turns out to be several times larger than that of the original document.

Meanwhile, in a scan-type search 1106, it is checked whether or not there is a keyword by directly scanning a document to be searched from beginning without using secondary data such as the indices. There are various scanning methods. For example, in a method called the BM (Boyer-Moore) method (Boyer R. S., Moore J. S., "A fast string search algorithm", Communications of the ACM, 20 (10): 762-772, 1997), high-speed scan is achieved by skipping an unnecessary spot that does not coincide with a keyword. The scan-type search requires no indices but has a drawback of a slow search speed.

A hybrid-type search is a method for compensating for the drawbacks of the above index-type search and scan-type search. First, documents are narrowed down by use of an index without positional information (1107). The index without positional information is an index holding only an appearance document list 1114 for each search term 1113. Since there is no positional information, connection conditions for the search term cannot be checked and thus a search error is mixed into the search. However, no search failure occurs. In the case of the example, Documents 1 and 2 are hit, but Document 2 is a document that should not actually be hit since two search terms "jouhou" and "kensaku" appear with one word therebetween in Document 2 ("jouhou-no-kensaku"). In the hybrid-type search, after the index-type search 1107 without positional information is performed, the document as a search result is scanned to check if the keyword actually appears in the document (1108). Compared with the normal scan-type search, the number of documents to be scanned is significantly reduced by the index search without positional information. Thus, the problem of the search speed in the normal scan-type search is suppressed. Moreover, the size of the index without positional information is much smaller than an index with positional information. Thus, the problem of the index size in the normal index search can be suppressed.

Although, in the embodiment of the present invention, the hybrid-type search is adopted, the search method is not limited thereto in the present invention. Hereinafter, an index data structure will be described first, and then the query formula sorting processing and the merged search processing, which are the main parts of the embodiment of the present invention, will be described.

Figure 12:
FIG. 12 is a view showing an example of a table which is included in a document DB in the embodiment of the present invention and stores term numbers and the number of documents including each of the terms.
Figure 13:
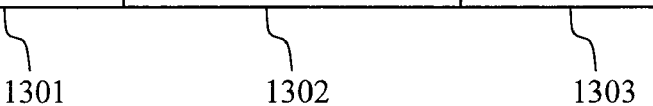
FIG. 13 is a view showing an example of a table which is included in the document DB in the embodiment of the present invention and stores term numbers, the number of documents including each of the terms, and a document number list of the documents including each of the term.

FIGS. 12 and 13 show examples of indices to be used for the hybrid-type search. The indices are stored in the document DB 103 shown in FIG. 1, and referred to by the search controller 104 and the search unit 105.

First, FIG. 12 shows an example of a table in which the number of documents containing a search term is recorded. A number for each search term (referred to as search term number) is recorded in 1201 and the number of documents including the search term is recorded in 1202. Thus, the number of documents including a certain search term can be immediately acquired by a program based on the search term number. Note that a table (realized by a hash table or the like) for converting a search term character string into a search term number is also separately prepared but description thereof will be omitted here.

FIG. 13 shows a substantial example of the index. 1301 shows a search term number, 1302 shows a number of documents including the search term, and 1303 shows a list of actual document numbers. Note that the number of documents shown in 1302 overlaps with that shown in FIG. 12 and thus may be omitted. Alternatively, data defined in FIG. 12 is not required as long as the number of documents can be quickly referred to from the search term by use of data defined in FIG. 13.

In the document DB 103 shown in FIG. 1, besides the data shown in FIGS. 12 and 13, data on main bodies of documents is also required. However, description thereof will be omitted here.

Figure 14:
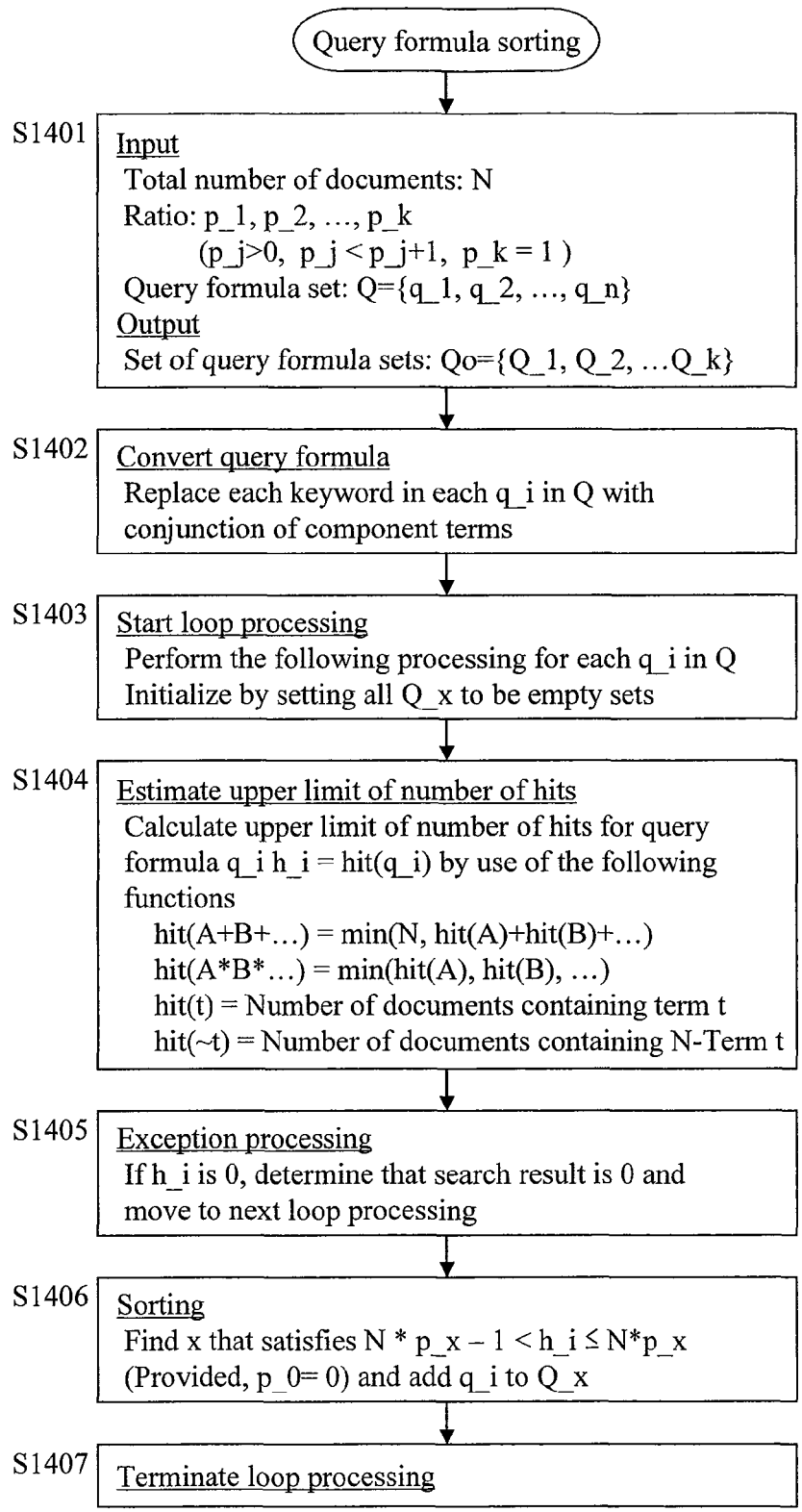
FIG. 14 is a flowchart of query formula sorting processing executed by a search controller according to the embodiment of the present invention.

FIG. 14 is a flowchart of the query formula sorting processing according to the embodiment of the present invention. This processing is executed by the search controller 104 shown in FIG. 1. Moreover, this processing corresponds to 82 in FIG. 8 and 1002 in FIG. 10 described above. The processing shown in FIG. 14 will be described below in conjunction with FIG. 15 showing an example of the processing.

S1401 shown in FIG. 14 shows input and output definitions in this processing. In this processing, a query formula set $Q=\{q\_1, q\_2, \ldots, q\_n\}$ containing n query formulas is sorted into k sets. A set obtained as a result of sorting is $Q_O=\{Q\_1, Q\_2, \ldots, Q\_k\}$. N is a total number of documents to be searched, and is used as a parameter in the sorting processing. $p\_1, p\_2, \ldots, p\_k$ are ratios of sorting, which are set by a user or a system manager. Note that each $p\_j$ is a positive number ($\geq 0$), and is in ascending order ($p\_j < p\_j+1$). Here, the last $p\_k$ is 1. A method for determining the ratios will be described later.

Figure 15:
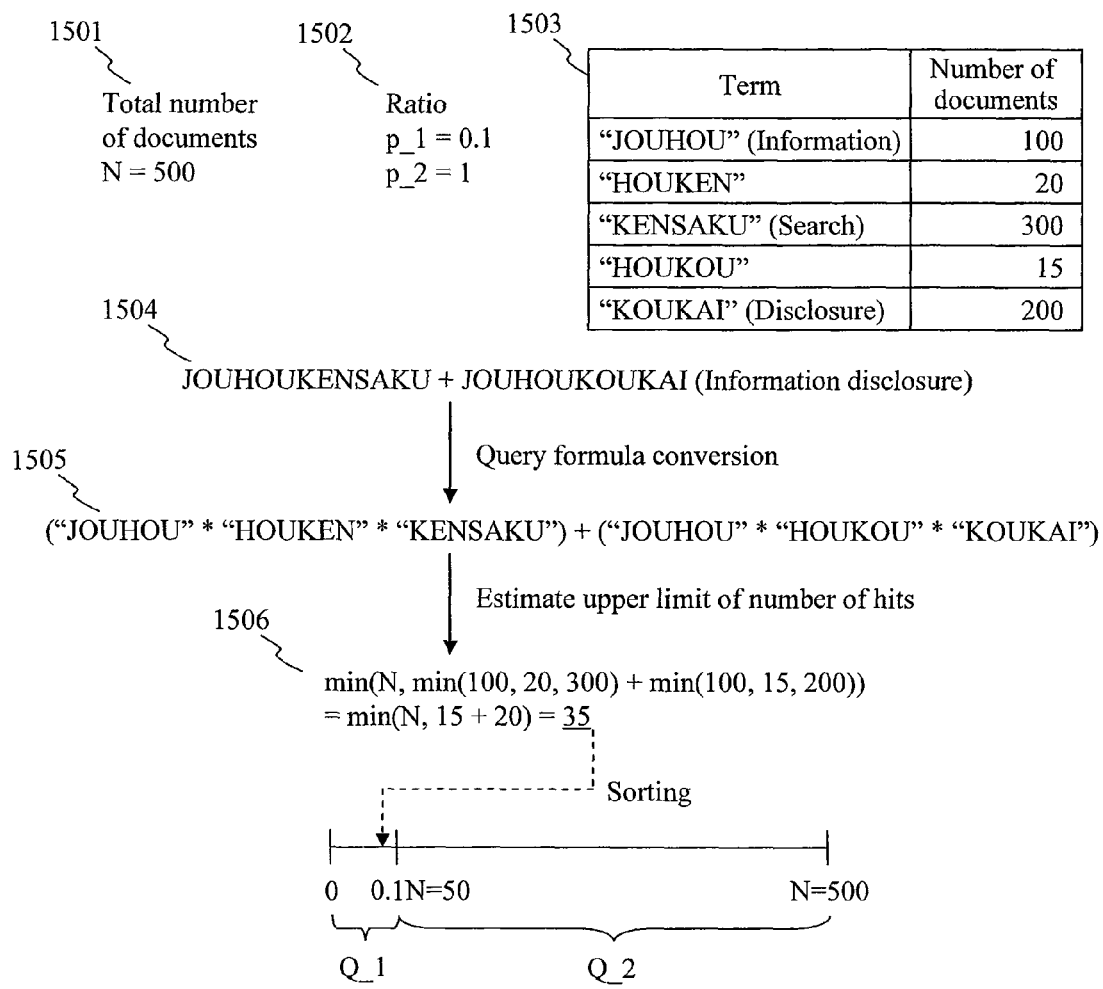
FIG. 15 is a view showing a processing example of the query formula sorting processing executed by the search controller according to the embodiment of the present invention.

In the example shown in FIG. 15, a total number of documents N is 500 (1501) and ratios are $p\_1=0.1$ and $p\_2=1$ (1502). This means, specifically, that query formulas are sorted into two sets.

In the sorting processing, a search speed is predicted from each query formula and query formulas having the almost the same predicted search speed are merged. Specifically, after the sorting, only the query formulas having almost the same predicted search speed are included in the same set. Here, a method for predicting the search speed becomes an issue. In the embodiment of the present invention, the hybrid type is selected as the search method. In the hybrid-type search, the number of documents as the result of the previous index-type search is set to be a parameter approximately proportional to the search speed. This is because the documents are scanned by subsequent scan-type search, and the overall search speed largely depends on a size of the documents to be scanned. Thus, prediction of the search speed approximately corresponds to prediction of the number of documents as the result of the index-type search. Also in this processing, the query formulas are sorted by use of a predicted value based on the predicted number of documents as the result of the index-type search.

When the index-type search is selected as the search method, the number of indices to be checked can be used as a parameter for predicting the search speed. Moreover, when the scan-type search is selected as the search method, the search speed is set approximately constant. However, in the case of a scan method in which skipping is performed, a shortest keyword length determines the search speed. Hereinafter, detailed description will be given of the case where the hybrid-type search is selected.

First, in S1402, an original query formula is converted into a query formula for the index-type search. This process depends on types of search terms registered in indices. In the embodiment of the present invention, as the most common method, bi-gram of characters are assumed to be registered in the indices. For query formula conversion, each keyword in each original query formula $q\_j$ is replaced with a conjunction of search terms (bi-gram of characters) which form the keyword.

In the example shown in FIG. 15, each of search keywords "jouhoukensaku (information search)" and "jouhoukoukai (information disclosure)" in an original query formula "jouhoukensaku+jouhoukoukai" (1504) is divided into bi-gram characters, and the divided characters are connected by conjunctions. Note that, here, a disjunction is expressed by "+" and the conjunction is expressed by "*". As a result, the original query formula is converted into "jouhou (information)*houken*kensaku (search)+jouhou (information)*houkou*koukai (disclosure)" (1505).

Next, in S1404, the number of documents hit $h\_j$=hit ($q\_j$) by the index-type search is estimated from the query formula $q\_j$ after conversion. Here, estimation is performed by use of the following simple method. However, besides the following method, various estimation methods are conceivable.

First, an OR-combined formula is estimated by the following expression.

$$\text{hit}(A+B+\ldots)=\min(N, \text{hit}(A)+\text{hit}(B)+\ldots)$$

In the case of OR combination, a value obtained by adding estimated values of components of the formula is set to be an estimated value of the entire formula. However, when a result of the addition exceeds the total number of documents, the total number of documents N is set to be the estimated value.

An AND-combined formula is estimated by the following expression.

$$\text{hit}(A*B*\ldots)=\min(\text{hit}(A), \text{hit}(B), \ldots)$$

In the case of AND combination, the smallest value among estimated values of components of the formula is set to be an estimated value of the entire formula.

When the estimation is recursively carried on according to the above rules, an estimated value hit(t) of a search term t is finally reached. This is equal to the number of documents hit for t, and an accurate value of the number of documents hit for t can be obtained by use of the indices shown in FIG. 12. In the case of negative~t, it is only necessary to subtract hit(t) from the total number of documents.

In the example shown in FIG. 15, the number of hits for the converted query formula 1505 is estimated to be 35 (1506). Here, as the number of hits for each term, each of values shown in 1503 is used.

Note, here, that the number of hits estimated by this method is set to be an upper limit of an actual number of hits. Thus, as to a query formula for which the number of hits is estimated to be 0, the number of hits in actual index search is also 0. Furthermore, in the hybrid-type search, it is guaranteed that the result of the index-type search is larger than the number of documents as the final search result. Thus, the final number of hits also turns out to be 0. Therefore, as to the query formula for which the number of hits is estimated to be 0 by this method, the result can be immediately returned by exception processing of S1405.

The number of hits can be estimated by use of a probabilistic method besides the above method. In this case, the following expressions are similarly recursively applied.

$$\text{hit}(A+B)=\text{hit}(A)+\text{hit}(B)-\text{hit}(A*B)$$

$$\text{hit}(A*B)=\text{hit}(A)*\text{hit}(B)/N$$

In the embodiment of the present invention, estimation using the above minimum value is adopted rather than the probabilistic estimation.

Finally, actual sorting processing is performed in S1406. In the embodiment of the present invention, the total number of documents N is divided by the sorting ratios $p\_1, p\_2, \ldots, p\_k$, and sorted into a region to which an estimated value $h\_j$ of the number of hits belongs. Specifically, x that satisfies $N*p\_(x-1) \leq h\_j < N*p\_x$ is obtained (however, $p\_0=0$), and $q\_j$ to be sorted is added to $Q\_x$.

In the example shown in FIG. 15, since N=500 when $p\_0=0, p\_1=0.1$ and $p\_2=1$, an interval used for sorting is set to be [0, 50, 500]. Since a predicted number of hits for a target query formula is 35, this query formula is sorted into $Q\_1$.

While the sorting processing has been described in detail above, the problem here is that the user or the system manager has to specify the sorting ratios. A method for determining optimum sorting ratios will be described later.

When the sorting processing is terminated, the respective query formula sets are subjected to merged search sequentially from the one having the smallest estimated value of the number of hits. This corresponds to 85 to 86 in FIG. 8, and 1006 to 1008 in FIG. 10.

Figure 16:
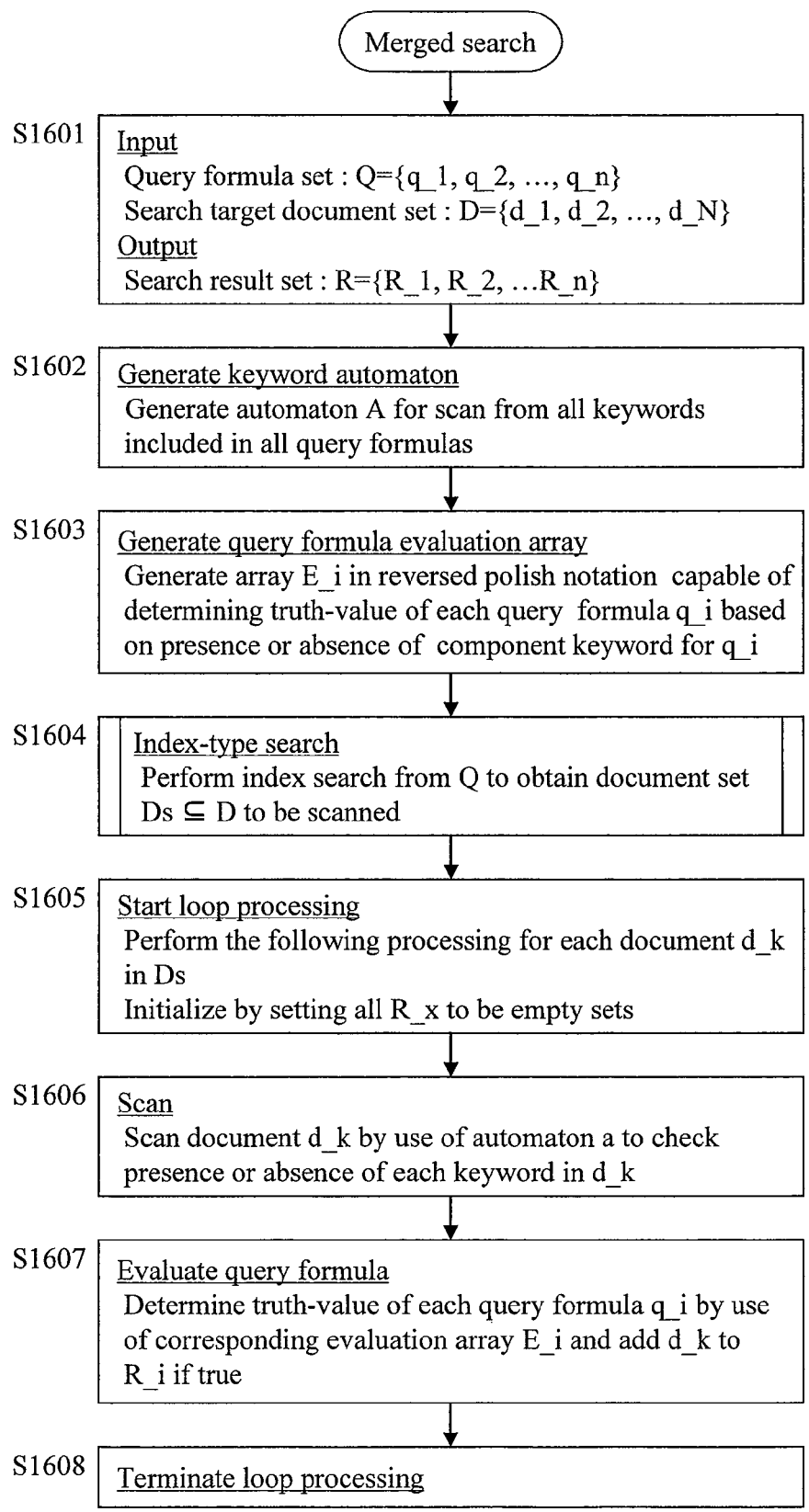
FIG. 16 is a flowchart of merged search processing executed by a search unit according to the embodiment of the present invention.

FIG. 16 is a flowchart of merged search processing according to the embodiment of the present invention. S1601 shows input and output definitions in this processing. In this processing, a query formula set $Q=\{q\_1, q\_2, \ldots, q\_n\}$ containing n query formulas is subjected to merged search to obtain a set of n search results $R=\{R\_1, R\_2, \ldots, R\_n\}$. Here, each $R\_i$ corresponds to a result of search obtained from corresponding $q\_i$ (a set of documents as a search result).

In the merged search, first, a keyword automaton A is generated in S1602. The keyword automaton is used for subsequent scan-type search. In the scan-type search, the keyword automaton is evaluated while scanning a document to be searched to check if there is a keyword that is registered in the keyword automaton.

Figure 18:
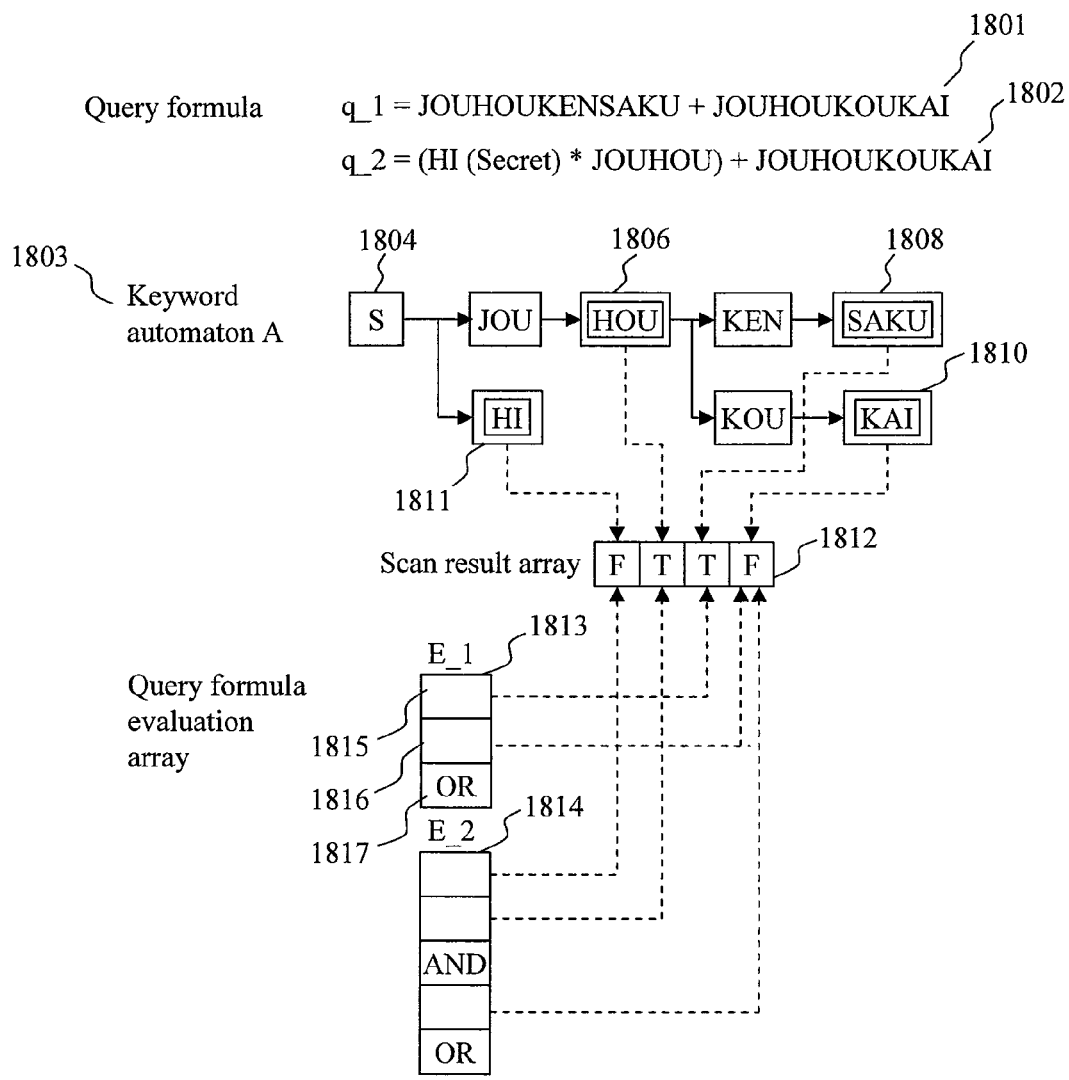
FIG. 18 is a view showing a processing example of the merged search processing executed by the search unit according to the embodiment of the present invention.

FIG. 18 shows an example of the keyword automaton. Note that a method for creating the keyword automaton is heretofore known. In the example shown in FIG. 18, a keyword automaton is generated from two query formulas "jouhoukensaku+jouhoukoukai" ($q\_1$: 1801) and "(hi (secret) *jouhou)+jouhoukoukai" ($q\_2$: 1802).

In order to generate the keyword automaton, first, each search keyword is extracted from a target query formula. In the case of the example, four keywords "jouhoukensaku", "jouhoukoukai", "hi" and "jouhou" can be extracted. Although the keyword "jouhoukoukai" is contained in both of $q\_1$ and $q\_2$, the keyword is treated as the same in the keyword automaton.

Next, a prefix tree 1803 is constructed for a set of the extracted keywords. This prefix tree serves as a main body of the keyword automaton. A node 1804 expressed by S represents a start node. Moreover, double square nodes represent end nodes, each of which indicates a position of a last character of each keyword. Specifically, a node 1806 corresponds to the keyword "jouhou", a node 1808 corresponds to "jouhoukensaku", a node 1810 corresponds to "jouhoukoukai" and a node 1811 corresponds to "hi". Note that, since the keyword automaton is formed into the prefix tree, overlapping prefixes are expressed by the same path. This property enables efficient check during scan. Moreover, pointers are extended from the end nodes to corresponding elements in a scan result array 1812 indicating presence or absence of the keywords.

In the scan-type search, while scanning a text to be searched, the nodes of corresponding characters are tracked on the keyword automaton. When the end node is reached, it is considered that there is a corresponding keyword. Thus, true (T) as a truth-value is entered into the corresponding scan result array element. The scan result array is initialized to false (F) for each document to be scanned. The scan-type search described above is achieved by simplifying a method called the AC (Aho-Corasick) method (Aho A. V., Corasick M. J., "Efficient string matching: an bibliographic search", Communications of the ACM, 18 (6): 333-340, 1975).

That is the end of the description of the method for creating the keyword automaton. Now, referring back to the flowchart of the merged search processing shown in FIG. 16, a query formula evaluation array is generated next in S1603. Only the presence or absence of each keyword can be found out from the keyword automaton. Therefore, the query formula evaluation array is used to determine a truth-value of each query formula (whether or not actually hit the query formula). For each query formula q_i, one query formula evaluation array E_i is generated so as to correspond to each query formula. This E_i is in reversed Polish notation of the query formula q_i.

There has heretofore been known a method for converting a query formula in infix notation (for example, "A*(B+C)") into that in the reversed Polish notation ("ABC+*"). FIG. 18 shows an example where the two query formulas q_1 (1801) and q_2 (1802) are converted into evaluation arrays E_1 (1813) and E_2 (1814) in the reversed Polish notation. For example, when "jouhoukensaku+jouhoukoukai" of q_1 is converted into the reversed Polish notation, three elements "jouhoukensaku", "jouhoukoukai" and "OR" are lined up. E_1 (1813) is an array expressing these elements directly. From a top element 1815, a pointer is extended to a scan result array element corresponding to "jouhoukensaku". In evaluation of the query formula, since the scan is already finished, all the elements in the scan result array are also determined (in other words, presence or absence of each keyword is known). Thus, presence or absence of the keyword "jouhoukensaku" can be immediately determined by the pointer of 1815. Similarly, from an element 1816 in the array, a pointer is extended to a scan result array element corresponding to "jouhoukoukai". A last element 1817 is an operator for checking a disjunction of the two preceding array elements. By evaluating E_1 from the top, the truth-value of the corresponding query formula can be determined.

Thus, preprocessing for the scan-type search in the merged search is finished. Next, actual search processing is carried out. Referring back to FIG. 16, first, a document set Ds to be subjected to the scan-type search is extracted from all documents set D by performing index-type search in S1604. The index-type search will be described in detail later with reference to FIG. 17.

Ds as a result of the index-type search is a document set always containing a final hit document. Thus, next, each document d_k in Ds is subjected to scan-type search to examine whether or not d_k satisfies each query formula.

In the scan-type search, first, by performing scan processing of S1606, the document d_k is scanned while tracking the generated keyword automaton A. As a result of the scan, presence or absence of each keyword is stored in the scan result array (1812 in FIG. 18).

Once the scan is finished, the query formula is evaluated in S1607. For each query formula, the evaluation array corresponding thereto is already generated in S1603. Thus, now, it is only necessary to perform evaluation in the reversed Polish notation while reading the array. The evaluation in the reversed Polish notation is also a heretofore known technique. If true as a result of the evaluation, the document d_k that is being evaluated is added to the element R_i of the search result set R corresponding to the query formula q_i.

As a result of the above processing, search result sets for the respective query formulas are accumulated in the search result set R. Note, here, that the scan processing is performed only once for each document even if there is more than one query formula.

Figure 17:
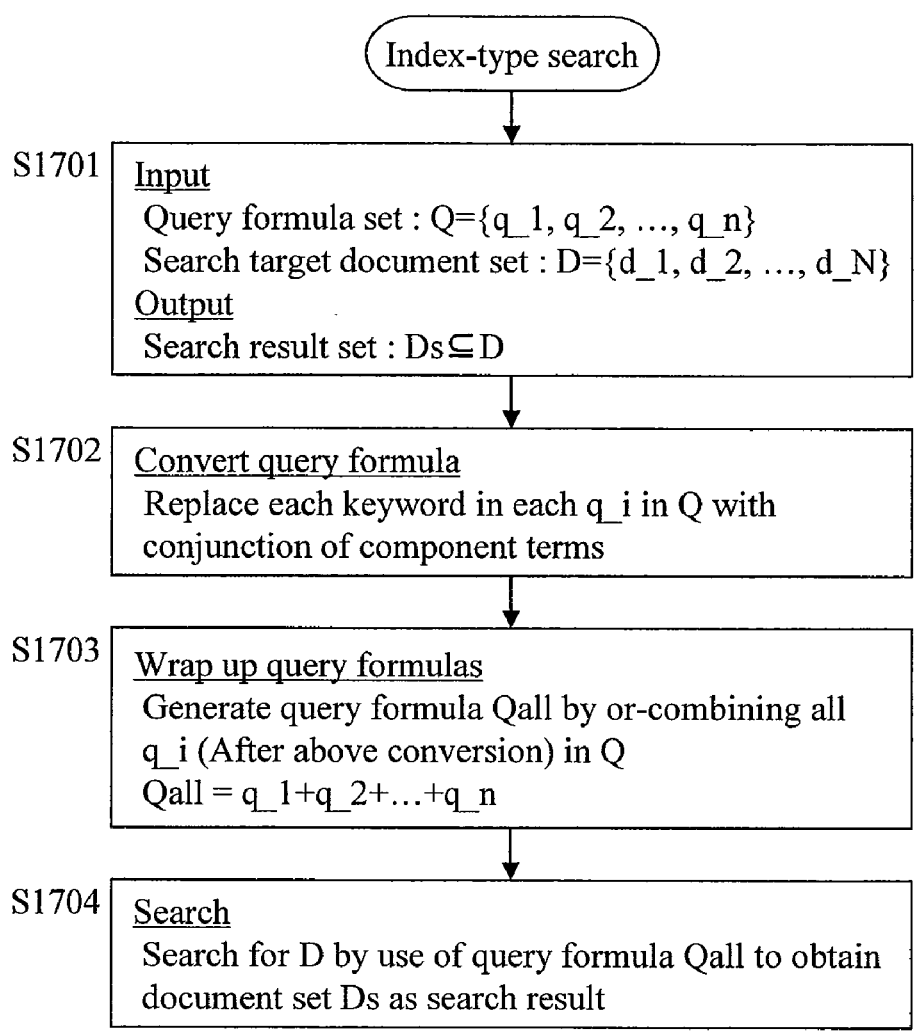
FIG. 17 is a flowchart of index-type search executed by the search unit according to the embodiment of the present invention.

Next, detailed description will be given of the index-type search for obtaining the document set Ds to be scanned. FIG. 17 is a flowchart of the index-type search according to the embodiment of the present invention. S1701 shows input and output definitions in this processing. In this processing, search is performed starting from a query formula set Q={q_1, q_2, ..., q_n} containing n query formulas. Thereafter, a document set as a result of the search is outputted as Ds.

First, query formula conversion is performed in S1702. Since this step is the same as S1402 in FIG. 14, description thereof will be omitted. Next, the query formulas are wrapped up in S1703. In the index-type search, it is required to extract all documents that may satisfy any of the query formulas. Thus, Qall=q_1+q_2+ ... +q_n obtained by OR-combining the respective query formulas q_i is set to be the query formula wrapped up. Next, search is executed by use of Qall in S1704 and a document set as a result of the search is set as Ds.

The respective processings according to the embodiment of the present invention have been described in detail above. The remaining problem is how the sorting ratios (p_1 to p_k in S1401) of the query formulas are determined in the query formula sorting processing (FIG. 14). The user and the system manager may set an arbitrary value. However, sufficient performance may not be achieved depending on a set value. Therefore, in the embodiment of the present invention, the sorting ratios are determined by use of the following method.

For simplification of the problem, it is considered to divide the query formula set into two sets. If it is wished to divide the query formula set into more than two sets, each of the two sets obtained by dividing the query formula set can be further divided into two sets by use of this method. Here, assuming that a ratio of division is p ($0 \leq p \leq 1$), a query formula having the ratio p is sorted for high-speed search (merged search 1) and a query formula having the ratio (1−p) is sorted for low-speed search (merged search 2). Moreover, it is assumed that $T_1$ is a search time of the high-speed search and $T_2$ is a search time of the low-speed search. Thus, an overall search time is calculated as $T_1+T_2$. Note that the search time of the merged search is assumed to be an independent search time for the slowest query formula to be subjected to the merged search. Although, in reality, a longer time is often required, the description is simplified here. Moreover, it is also assumed that the query formulas randomly arrive.

FIG. 19 is a view showing a waiting time and a search time for each arrival time of the query formula. A proportion of the query formulas with the query formula arrival time of $0 \leq t < T_1$ is $T_1/(T_1+T_2)$. Moreover, among those query formulas, a ratio of those for the high-speed search is p and a ratio of those for the low-speed search is (1−p). In this time period $0 \leq t < T_1$, the high-speed search (merged search 1) is executed. Thus, the query formulas that have arrived within the time period are processed by the next low-speed search (merged search 2). According to the method shown in FIG. 10, the query formulas for the high-speed search which have arrived during execution of the high-speed search are processed by the next low-speed search, without waiting for the next high-speed search. Thus, for all the query formulas, an average waiting time is set to $T_1/2$ and a search time is set to $T_2$.

Now, query formulas that have arrived at the next $T_1 \leq t < T_1 + T_2$ are considered. Since the low-speed search is executed within this time period, the query formulas for the high-speed search which have arrived during this time period, can be processed by the next high-speed search. Specifically, an average waiting time is $T_2/2$ and a search time is $T_1$. Meanwhile, the query formulas for the low-speed search, which have arrived during this time period, have to wait for low-speed search after the next high-speed search. Thus, an average waiting time is set to $T_2/2 + T_1$ and a search time is set to $T_2$.

FIG. 20 shows results of calculation of average response times and worst response times after putting together the above cases. A normal method is the conventional method described with reference to FIGS. 6 and 7 in which all query formulas are subjected to merged processing without sorting the query formulas. Moreover, a rotating searching method is the method according to the embodiment of the present invention. Here, comparing the average response times, the method according to the embodiment of the present invention exceeds the normal method when an inequality indicated by 2001 in FIG. 20 is established. Moreover, the larger the value on the left-hand side of the inequality 2001, the greater the effect of the method according to the embodiment of the present invention.

Figure 21:
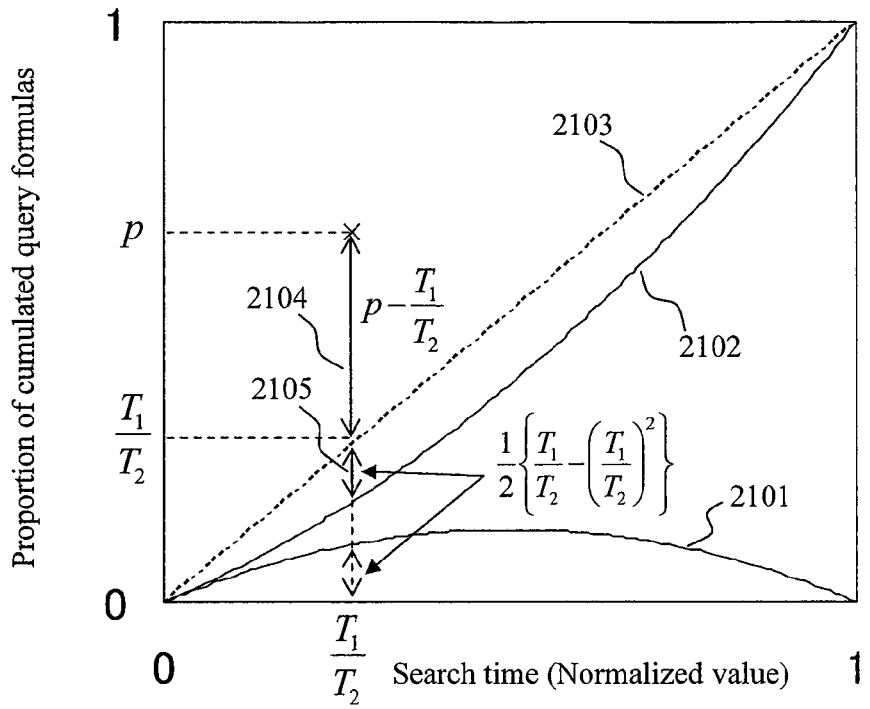
FIG. 21 is a query formula distribution chart for determining an optimum division ratio of query formulas in the embodiment of the present invention.

FIG. 21 shows a region where the inequality 2001 is established. A horizontal axis represents the search time, which is normalized by $T_1/T_2$. A vertical axis represents a proportion of query formulas for which search is finished before the corresponding search time when the search is independently performed. In other words, the vertical axis represents a division ratio p of the query formulas.

The left-hand side of the inequality 2001 is set to be a value obtained by adding a line segment 2104 and a line segment 2105 in FIG. 21. Here, a quadratic curve 2102 is a curve obtained by vertically inverting a quadratic curve 2101 and drawing from a diagonal line 2103. Note that the diagonal line 2103 represents a distribution in the case where the query formulas are evenly distributed regardless of the search time. The inequality 2001 is established as long as an actual distribution is above the quadratic curve 2102. This also means that the further away from the quadratic curve 2102 thereabove, the greater the effect of the method according to the embodiment of the present invention. Thus, in order to determine an optimum division ratio p, the query formula distribution is plotted on the graph shown in FIG. 21, and a point furthest away from the quadratic curve 2102 thereabove is determined. If the query formulas are evenly distributed, a distribution curve is set equal to the diagonal line 2103. Thus, the optimum point is set to be a point where p=0.5. This means that the optimum division ratio is achieved when the high-speed search and the low-speed search are equally divided.

Figure 22:
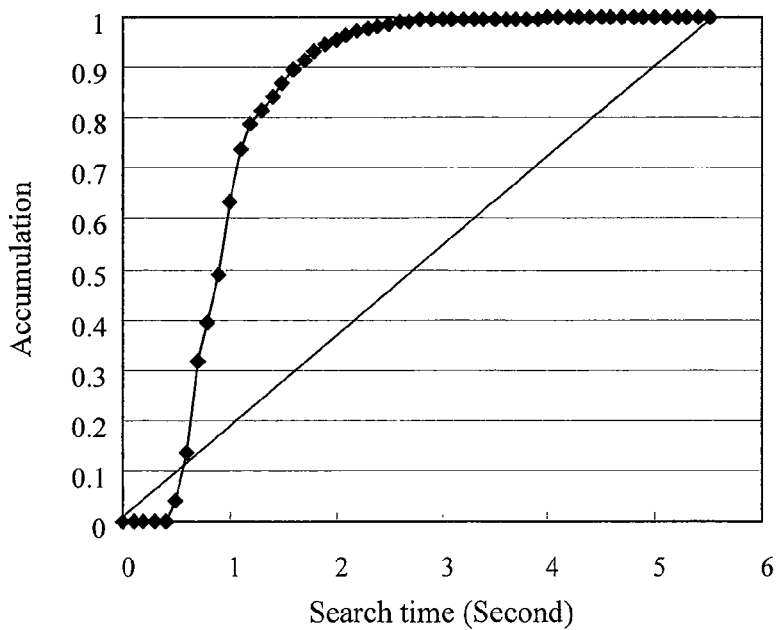
FIG. 22 is a graph showing an actual example of the query formula distribution chart shown in FIG. 21.

FIG. 22 is a graph showing an actual distribution of query formulas. As can be seen from FIG. 22, an optimum division ratio is about 0.9. This means that 90 percent of query formulas are sorted for the high-speed search. As can also be seen from FIG. 22, in order to set the division ratio to 0.9, query formulas having the independent search time of 1.5 to 2 seconds are sorted for the high-speed search. In the embodiment of the present invention, as described above, the search time is approximately equal to the estimated number of documents as the result of the index-type search. Thus, a horizontal axis of FIG. 22 represents the number of documents as the result of the index-type search.

The optimum division ratio may actually be determined by previously making a distribution chart such as FIG. 22 from a certain number of query formulas. However, also conceivable is a method for gradually making changes to obtain the optimum division ratio while operating the search service. Therefore, every time the search is finished, data may be accumulated in a table shown in FIG. 23. In the table, 2301 represents the estimated number of documents as the result of the index-type search, and 2302 represents the number of query formulas. Since the table of FIG. 23 has the same information as that shown in FIG. 22, an optimum division ratio at the point can be calculated from the table of FIG. 23. In such case, an appropriate division ratio is provided as an initial value in an initial state where no query formulas are accumulated yet. Thereafter, every time a certain number of query formulas are accumulated, parameters for sorting may be sequentially updated by use of distribution information on the query formulas already accumulated.

EXPLANATION OF REFERENCE NUMERALS 10 search server
101 CPU
102 memory
103 document DB
104 search controller
105 search unit
11 network
121, 121, 123 search clients

What is claimed is:

1. A system for searching documents by use of a query formula composed of a Boolean formula of keywords, the system or program, comprising: a processor; a memory for storing programs to be executed by the processor;
   a document database for storing documents to be searched and index information for searching the documents;
   a query formula controller for sorting a plurality of query formulas into a plurality of query formula sets based on predicted search speeds of the respective query formulas;
   a search unit for search processing for each of the plurality of sorted query formula sets sequentially from the set having a fastest predicted search speed, and for, in each search processing, merging the query formulas in the corresponding query formula set into a formula and thereby searching from the merged formula; and
   wherein when a predicted search speed of the query formula arriving in the middle of merged search of a query formula set one, wherein a predicted search speed of the query formula set one is faster than a predicted search speed of a query formula set two, and query formula set two is subjected to merged search after the query formula set one, the search unit adds the query formula to the query formula set two and then performs the merged search.

2. The system for searching documents, according to claim 1, wherein a document list to be searched, in which a continuous character string having a certain length appears, is stored in the document database as the index information, in the merged search, index search is performed by use of the index information without taking into consideration a connection condition of the continuous character string forming each keyword in the query formula, the connection condition of the continuous character string forming each keyword in the query formula is examined while scanning, from a top character, each document acquired by the index search, and the document that has passed the examination is outputted as a final search result.

3. The system for searching documents, according to claim 2, wherein the search controller uses the index information to acquire, for each continuous character string forming each keyword in the query formula, the number of documents in which the continuous character string appears, predicts the number of documents as a result of index search for the query formula on the basis of a combination of the numbers of documents, and sets the predicted number of documents as the predicted search speed.

4. The system for searching documents, according to claim 2, wherein the number of documents as a result of index search for a previously processed query formula is accumulated as data, and when the query formulas are sorted by the search controller, a parameter for sorting are calculated from the accumulated data.

5. The system for searching documents, according to claim 4, wherein in an initial state where there is no information on previously processed query formulas, a parameter previously specified is used for sorting, and every time a certain number of query formulas are accumulated, a parameter for sorting is updated by use of the data already accumulated.

* * * * *